United States Patent [19]
Moulinet

[11] Patent Number: 5,207,616
[45] Date of Patent: May 4, 1993

[54] TRANSMISSION JOINT, PART OF A TRANSMISSION LINE EQUIPPED WITH SUCH A JOINT AND PROCESS FOR INSTALLING A JOINT

[75] Inventor: Francois Moulinet, Triel sur Seine, France

[73] Assignee: Glaenzer Spicer, Poissy, France

[21] Appl. No.: 692,446

[22] Filed: Apr. 26, 1991

[30] Foreign Application Priority Data

Apr. 27, 1990 [FR] France .............................. 90 05436

[51] Int. Cl.[5] .......................... F16D 3/202; F16D 3/84
[52] U.S. Cl. ...................... 464/111; 403/51; 403/227; 464/170; 464/905
[58] Field of Search ............... 464/111, 170, 901, 905; 403/50, 51, 225, 227

[56] References Cited

U.S. PATENT DOCUMENTS

| | | |
|---|---|---|
| 3,646,777 | 3/1972 | Anderson et al. . |
| 3,905,209 | 9/1975 | Conrad . |
| 4,436,310 | 3/1984 | Sawabe et al. ................... 464/111 X |
| 4,976,129 | 12/1990 | Setzer et al. ..................... 464/901 X |

FOREIGN PATENT DOCUMENTS

| | | |
|---|---|---|
| 1505262 | 8/1969 | Fed. Rep. of Germany . |
| 3343794 | 6/1985 | Fed. Rep. of Germany . |
| 3504670 | 8/1985 | Fed. Rep. of Germany . |
| 816502 | 8/1937 | France . |
| 1180477 | 6/1959 | France . |
| 1268917 | 12/1961 | France . |
| 2386726 | 11/1978 | France . |
| 2549782 | 2/1985 | France . |
| 864465 | 4/1961 | United Kingdom . |
| 2015696 | 9/1979 | United Kingdom . |
| 2076635 | 11/1981 | United Kingdom . |
| 2199114 | 6/1988 | United Kingdom . |

*Primary Examiner*—Daniel P. Stodola
*Assistant Examiner*—William G. Battista, Jr.
*Attorney, Agent, or Firm*—Harness, Dickey & Pierce

[57] ABSTRACT

A transmission joint has a first element connected to a first shaft and mounted in an articulated manner in a second element to form a housing fastened to a transmission member. The housing includes a radial fastening flange mounted axially slidably relative to the outer casing of the housing and an apparatus for immobilizing the fastening flange axially relative to the outer casing of the housing when the second element is in the fixed position on the transmission member. The process employed to assemble the transmission joint temporarily secures the housing relative to the first member until the housing is secured to the fastening flange.

12 Claims, 1 Drawing Sheet

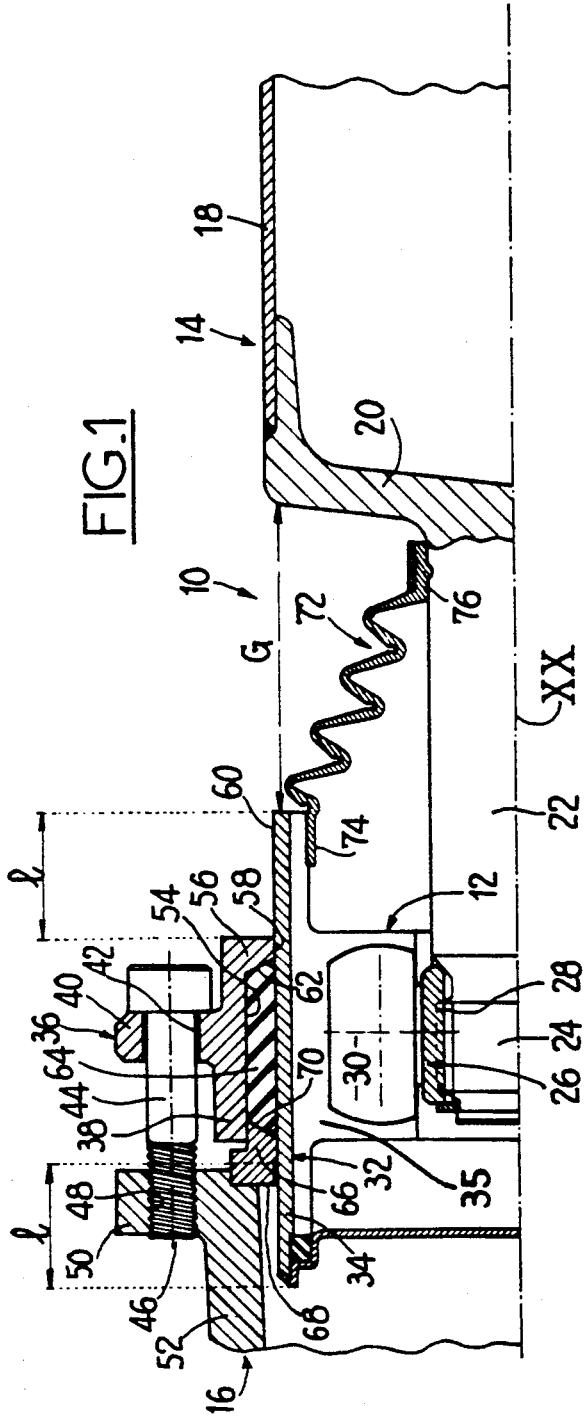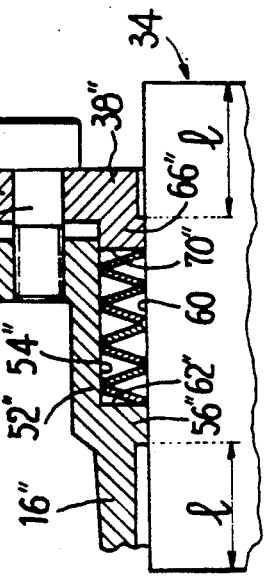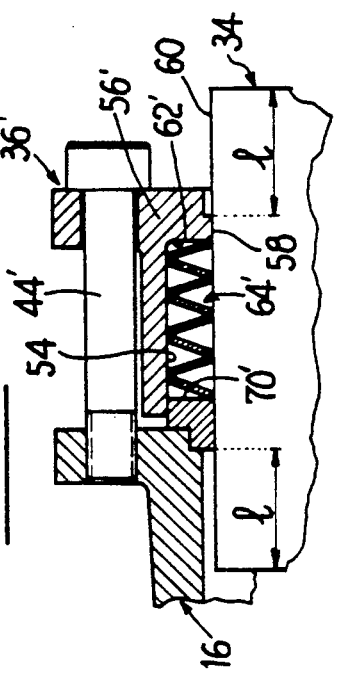

TRANSMISSION JOINT, PART OF A TRANSMISSION LINE EQUIPPED WITH SUCH A JOINT AND PROCESS FOR INSTALLING A JOINT

The present invention relates to a transmission joint of the type comprising a first element connected to a first shaft and mounted in an articulated manner in a second element forming a housing and fastened to a transmission member.

Transmission joints of this type are used particularly in motor-vehicle transmissions. The design of vehicles imposes many constraints because of the presence of members causing an obstruction during the installation of the transmission on the vehicle, and also has considerable dimensional spreads in terms of the relative position of the driving and driven members connected to one another by means of the transmission.

When the transmission joints are designed to absorb the relative operating movements between the driving and driven members, this absorption capacity inherent in the design of the transmission joint can make it possible partially to absorb the dimensional spreads during assembly.

It is known that this capacity existed when the engines of vehicles were placed in a longitudinal position, for the operating movements were only small and the design of the joints was such that they could easily absorb the dimensional spreads during assembly on the vehicle.

With the increasingly widespread design of motor vehicles with engines arranged transversely, the relative movements of the driving and driven members have become much greater and the design of the transmission joints, particularly for longitudinal transmissions, no longer makes it possible to absorb the dimensional spreads during assembly on the vehicle.

Attempts to change the design of transmission joints of the sliding type in order to solve this two-fold problem led to solutions which were inadmissible as regards both the mechanical operating part of the joints and the sealing concertinas equipping them.

It was therefore also proposed to provide accessory devices for giving the transmission appropriate length, which were independent of the joints themselves.

The main disadvantage of these devices is that they are juxtaposed with the joints and therefore greatly increase the axial bulk of these assemblies. It is also found that there are cantilevering phenomena on the transmission joints which adversely affect the dynamic balancing of the transmissions.

The object of the present invention is to provide a transmission joint which makes it possible to absorb high assembly spreads of the transmissions equipped with such a joint, whilst at the same time preserving for the joint the best possible operating characteristics, especially movement characteristics.

To achieve this, the invention provides a transmission joint of the abovementioned type, characterised in that the housing of the second element comprises a radial fastening flange mounted axially slidably relative to the outer casing of the housing and means for immobilising the fastening flange axially relative to the outer casing of the housing when the second element is in the fixed position on the transmission member.

According to other characteristics of the invention:

the means for immobilising the fastening flange axially comprise frictional connection means which interact with the outer cylindrical surface of the outer casing of the housing;

the frictional connection means comprise a radially expandable element arranged in an annular cylindrical receptacle delimited radially by the outer cylindrical surface of the outer casing and by a portion of inner cylindrical surface formed in the body of the fastening flange or in a part of the transmission member;

the frictional connection means comprise a first and a second radial compression surface formed respectively on the fastening flange and on the transmission member and compressing the expandable element axially in its receptacle during the clamping of the fastening flange on the transmission member;

the fastening flange comprises a blind axial bore, the cylindrical surface of which forms the portion of inner cylindrical surface of the receptacle and the bottom wall of which forms the first radial compression surface, the transmission member comprising an axial piston-shaped extension which penetrates into the axial bore of the fastening flange and the radial end surface of which forms the second radial compression surface;

the fastening flange comprises an axial piston-shaped extension, the radial end surface of which forms the first radial compression surface and which penetrates axially into a blind axial bore which is made in the transmission member and the cylindrical wall of which forms the portion of inner cylindrical surface of the receptacle and the bottom wall of which forms the second radial compression surface;

the expandable element is a sleeve made of elastic material;

the expandable element consists of a stack of elastic washers;

the transmission joint is a fixed joint or a sliding joint.

The invention also provides part of a motor-vehicle transmission line, of the type comprising a transmission shaft equipped at each of its ends with a transmission joint according to the teachings of the invention.

Finally, the invention provides a process for installing a transmission joint according to the teachings of the invention, characterised in that it involves:

a) temporarily immobilising the housing relative to the first element in a predetermined axial position;

b) allowing the housing to position itself freely relative to the fastening flange;

c) immobilising the fastening flange axially relative to the housing; and d) freeing the housing relative to the first element.

According to another characteristic of the process, the temporary axial immobilisation of the housing relative to the first element is carried out by means of an adjusting jig.

Other characteristics and advantages of the invention will emerge from a reading of the following detailed description, for an understanding of which reference will be made to the accompanying drawing in which:

FIG. 1 is a half-view in axial section of part of a motor-vehicle transmission line comprising a transmission joint according to the teachings of the invention;

FIG. 2 is a detailed view of FIG. 1, illustrating a first alternative embodiment of the frictional connection means between the housing and the fastening flange; and FIG. 3 is a view similar to that of FIG. 2, illustrating a second alternative embodiment of the connection means.

FIG. 1 shows a part 10 of a motor-vehicle transmission line of general axis X—X.

The transmission comprises a transmission joint 12 which connects a first transmission shaft 14 to a transmission member 16 consisting, for example, of an output member of a gearbox or of a differential.

The shaft 14 is shown in the form of a tube 18 closed at its end by means of a welded endpiece 20 extended axially by a solid shaft 22, the splined end 24 of which receives the first element 26 of the transmission joint 12 consisting of a tripod.

In fact, in the embodiment illustrated in FIG. 1, the transmission joint 12 is a sliding homokinetic joint of the tripod type with rollers.

The tripod 26 comprises a hub 28 which is immobilised axially on the splined end 24 and each of the three arms of which receives a roller 30.

The second element 32 of the transmission joint 12 is a housing or barrel which comprises pairs of rolling tracks 35, each of which receives a roller 30.

The housing 32 comprises a circular-cylindrical outer casing 34, the axial length of which is clearly greater than that of the rolling tracks 36.

In FIG. 1, the tripod 26 is shown in its middle axial position which occupies relative to the housing 32, in relation to which it can be displaced axially on either side of this middle position, in order to absorb the operating movements for the transmission.

The housing 32 is connected to the transmission member 16 by means of a fastening flange 36 comprising a body 38 and a radial collar 40.

The collar 40 comprises a series of axial drillholes 42 which are distributed uniformly about its axis and each of which receives a fastening bolt 44, the threaded end 46 of which is received in a corresponding internal thread 48 made in an opposite radial collar 50 extending the tubular end part 52 of the transmission member 16.

The axial body 38 of the flange 36 comprises a blind inner bore 54 delimited to the right by a radial bottom 56, itself comprising a bore 58 in which the outer surface 60 of the outer casing 34 of the housing 32 is received slidably.

The outer surface 60, the cylindrical inner surface of the bore 54 and the inner surface 62 of the bottom 56 delimit a cylindrical annular receptacle in which a rubber sleeve 64 is arranged.

The sleeve 64 constitutes a radially expandable element which makes it possible to immobilise the fastening flange 36 axially and in terms of rotation relative to the housing 32.

For this purpose, the element 64 can be compressed axially by a cylindrical annular piston 66, the free end of which penetrates into the bore 54 and the rear radial face 68 of which is fastened to the tubular part 52 of the transmission member 16.

The rubber sleeve 64 is therefore capable of being compressed axially between two substantially radial compression surfaces consisting, on the one hand, of the surface 62 of the bottom 56 of the bore 64 and of the free front end face 70 of the annular piston 66.

The relative displacement of the flange 36 relative to the transmission member 16 brings about a greater or lesser axial compression and therefore radial expansion of the sleeve 64 in its receptacle.

In the non-compressed position, that is to say in the initial position of delivery of the sub-assembly consisting of the two elements of the transmission joint before the flange 36 is fastened by clamping to the transmission member 16, the outer casing 34 of the housing 32 is free to slide axially relative to the flange 36 on either side of the middle position shown in FIG. 1 by an adjustment dimension "1".

It would be appreciated that the clamping of the fastening flange 36 by means of the bolts 44 brings about simultaneously the radial expansion of the sleeve 64 and therefore the axial immobilisation of the flange relative to the housing 32 as a result of the frictional connection made by the sleeve 64 between the outer surface 60 of the outer casing 34 and the inner cylindrical surface of the bore 54 of the flange 36.

The transmission joint also comprises a sealing concertina 72, one end 74 of which is fastened to the inner cylindrical surface of the housing 32 and the opposite end 76 of which is mounted on the solid shaft 22.

The transmission part 10 is installed on a motor vehicle and given the appropriate length in the following way.

After the sub-assembly consisting of the first shaft 14 and of the transmission joint 12 has been installed on the motor vehicle, the operator temporarily immobilises the housing 32 axially relative to the first shaft 14 and therefore relative to the tripod 26 by means of an adjusting jig (not shown) which determines a fixed dimension G between the housing 32 and the transmission shaft 14.

This dimension is selected so that the tripod 26 occupies its middle operating position relative to the housing 32, as shown in FIG. 1.

The operator subsequently displaces the flange 36 and the bolts 44 axially, in order to carry out its fastening on the transmission member 16 as a result of the progressive screwing of the bolts 44 into the internally threaded holes 48.

At the start of this operation, the sleeve 64 is not compressed axially and the housing 32 positions itself freely relative to the fastening flange 36, in order to make it possible to give the transmission-line part 10 "the appropriate length" and thereby absorb the tolerances attributable to the dimensional production spreads of the vehicle.

When the operator continues to tighten the bolts 44, he progressively brings about the radial expansion of the sleeve 64 and therefore the axial and rotational immobilisation of the fastening flange 36 relative to the housing 32 and consequently the axial immobilisation of the housing 32 relative to the transmission member 16.

In the embodiment shown in the figures, the expandable element consisting of the sleeve 64 simultaneously performs the function of axial immobilisation and also of an element transmitting the drive torque between the transmission member 16 and the shaft 14. However, the invention is not limited to this design, and for example the transmission of the torque can be obtained by means of a splined connection between the bore 58 and the outer surface 60 of the outer casing 34.

Once the operation of clamping and fastening the flange 36 has been completed, the operator frees the housing 32 relative to the tripod 26 by removing the adjusting jig.

The transmission joint is then ready to operate under ideal conditions of operating movement, that is to say on either side of its middle axial position shown in FIG. 1.

In the alternative embodiment illustrated in FIG. 2, in which the same reference numerals have been used to denote identical or equivalent elements, the radially expandable element 64' consists of a stack of elastic washers, for example of the Belleville type, of which the axial compression by the compression surfaces 62' and 70' bring about an increase of their inside and outside diameters and therefore the frictional connection of the surfaces 60 and 54.

The inner and outer edges of each of the washers of the stack can be smooth or serrated.

In the embodiment illustrated in FIG. 3, the receptacle receiving the expandable element consisting of a stack of elastic washers is delimited radially by the outer cylindrical surface 60 of the outer casing 34 of the housing and by the inner cylindrical surface of a blind bore 54 which, here, is made in the tubular end portion 52" of the transmission member 16.

The body 38 of the flange 36 comprises an axial extension in the form of an annular piston 66 which penetrates into the bore 54.

As in the embodiments shown in FIGS. 1 and 2, the radial end face 70" of the annular piston 66" and the radial face 62" of the bottom 56" of the bore 54 ensure a progressive axial compression of the expandable element 64 during the tightening of the bolts 44".

According to an alternative embodiment (not shown), it is possible to ensure that the free left-hand end of the housing 32 is centred by its casing 34 in a guide portion of the corresponding diameter of the transmission member 16, for example in the inner bore of the tubular end part 52.

I claim:

1. A part of a motor-vehicle transmission line comprising a transmission shaft equipped at each of its ends with a transmission joint, said joint including a first element connected to a first shaft and mounted in an articulated manner in a second element forming a housing and fastened to a transmission member, said housing including a radial fastening flange mounted axially slidably relative to an outer casing of the housing and means for immobilizing the fastening flange axially relative to the outer casing of the housing when the second element is in the fixed position on the transmission member.

2. A transmission joint of the type comprising a first element connected to a first shaft and mounted in an articulated manner in a second element forming a housing and fastened to a transmission member, said housing including a radial fastening flange and an outer casing, said radial fastening flange mounted axially slidably relative to said outer casing of the housing and means for immobilizing the fastening flange axially relative to the outer casing of the housing when the second element is in the fixed position on the transmission member.

3. The transmission joint according to claim 2, wherein the means for axial immobilization includes frictional connection means for axially and rotationally immobilizing said fastening flange and positioned about the outer casing of the housing.

4. The transmission joint according to claim 3, wherein the frictional connection means comprises a radially expandable element arranged in an annular cylindrical receptacle delimited radially by the outer casing and by a portion of the transmission member.

5. The transmission joint according to claim 3, wherein the frictional connection means includes a radially expandable element and a fastening flange, said expandable element arranged in an annular cylindrical receptacle delimited radially by the outer casing and by a portion of the fastening flange.

6. The transmission joint according to claim 5, wherein the expandable element is a sleeve made of elastic material.

7. The transmission joint according to claim 5, wherein the expandable element is a stack of elastic washers.

8. The transmission joint according to one of claims 4 or 5, wherein the frictional connection means includes a first and a second radial compression surface formed respectively on the fastening flange and on the transmission member and compressing the expandable element axially in its receptacle during the clamping of the fastening flange on the transmission member.

9. The transmission joint according to claim 8, wherein the fastening flange includes a blind axial bore, the cylindrical surface of which forms said portion of inner cylindrical surface of the receptacle and the bottom wall of which forms said first radial compression surface and in that the transmission member includes an axial piston-shaped extension which penetrates into the axial bore of the fastening flange and the radial end surface of which forms said second radial compression surface.

10. The transmission joint according to claim 8, wherein the fastening flange includes an axial piston-shaped extension, the radial end surface of which forms said first radial compression surface and which penetrates axially into a blind axial bore which is made in the transmission member and the cylindrical wall of which forms said portion of inner cylindrical surface of the receptacle and the bottom wall of which forms said second radial compression surface.

11. A process for installing a transmission joint comprising:
   a) providing a transmission joint including a first element connected to a first shaft and mounted in an articulated manner in a second element forming a housing and fastened to a transmission member, said housing including a radial fastening flange mounted axially slidably relative to an outer casing of the housing and means for immobilizing the fastening flange axially relative to the outer casing of the housing when the second element is in the fixed position on the transmission member;
   b) temporarily immobilizing the housing relative to the first element in a predetermined axial position;
   c) allowing the housing to position itself freely relative to the fastening flange;
   d) immobilizing the fastening flange axially relative to the housing; and
   d) freeing the housing relative to the first element.

12. The process according to claim 11, before temporarily immobilizing the housing, providing an adjusting jig for enabling the temporary axial immobilization of the housing relative to the first element.

* * * * *